UNITED STATES PATENT OFFICE.

CARL OTTO WEBER, OF SALFORD, AND CHARLES F. CROSS, OF LONDON, ENGLAND, ASSIGNORS TO ISIDOR FRANKENBURG, OF SALFORD, ENGLAND.

METHOD OF MAKING CELLULOSE TETRACETATE.

SPECIFICATION forming part of Letters Patent No. 627,031, dated June 13, 1899.

Application filed September 17, 1898. Serial No. 691,227. (No specimens.)

*To all whom it may concern:*

Be it known that we, CARL OTTO WEBER, residing at Greengate, Salford, county of Lancaster, and CHARLES FREDERICK CROSS, residing at 4 New Court, Lincoln's Inn, London, England, citizens of England, have invented certain new and useful Improvements in the Manufacture of Cellulose Tetracetate, of which the following is a specification.

The manufacture of cellulose acetate by heating an equimolecular mixture of cellulose and magnesium acetate with two molecules of acetyl chloride, with or without further addition of acetic anhydride, cannot be carried out on a large scale, owing to the impossibility of controlling the reaction, which although slow to begin with invariably proceeds at an increasing rate, causing a rise of temperature fatal to the desired result. Moreover, the final product obtained, if not destroyed, or at least seriously affected by the heat of the reaction, is obtained in the shape of a cake of enormous toughness, the further working of which almost amounts to a practical impossibility. All these difficulties could be readily avoided if the reaction between the acetyl chloride and the cellulose would take place in the presence of a quantity of some solvent sufficient to dissolve the acetyl cellulose at the rate at which it is formed. Such a solvent is at present quite unknown, and by adding any of the generally-used solvents to the above-mentioned acetylizing mixture, the reaction either never starts at all or results in the formation of a product other than cellulose tetracetate. It has been observed that in preparing an acetylizing mixture as above described, and allowing the reaction to start, certain solvents may now be added in at first very small quantities, increasing, however, in volume as the reaction proceeds. Under these circumstances the addition of the solvent, although distinctly restraining the reactive energy of the acetylizing mixture, is no longer able to stop the reaction altogether, which in this manner is easily kept under control, and finally results in the formation of a perfect thinly-viscous solution of cellulose tetracetate. Of solvents to be used in this manner only very few of the known indifferent solvents are, however, applicable. Of these we have found that nitro-benzene, its homologues epichlorhydrine and dichlorhydrine, give very good results.

In carrying out this invention three pounds of an equimolecular mixture of cellulose and magnesium acetate is employed—that is to say, a mixture of 1.6 pounds of cellulose, preferably such as is obtained from the well-known sulpho-carbonate of cellulose, with 1.4 of magnesium acetate. To this is added 1.8 pounds of acetylchloride and one pound or thereabout of acetic anhydride. This mixture is now placed into a kneading-machine provided with a heating or refrigerating jacket and the mass most intimately mixed. As soon as the reaction has gained an appreciable start one gallon of nitro-benzene, or the equivalent thereof—that is to say, any of its homologues or epichlorhydrine or dichlorhydrine—is added, at first in very small quantities, adding a further quantity only after the previous addition is absolutely homogeneously incorporated into the acetylizing mixture, the addition as to quantity and time being regulated in such a manner that the last and largest portion of the above-named quantity of solvent is added at about the time when the reacting mixture has reached its temperature maximum, which should not exceed 70° centigrade. The agitation of this mixture is then continued for three consecutive hours, when a thinly-viscid solution of the tetracetate is obtained, containing only mere traces of lower acetates or unaltered cellulose. This solution now while still in the hot state is strained and then immediately run into five gallons of alcohol. The acetate separates out in the form of fine white flakes, which are separated from the mother-liquor by filtration, washed with warm alcohol, which washings are added to the mother-liquor, and then filter-pressed. The product thus obtained is without previous drying broken up and stirred in a very thin pulp with water, which is then heated to boil until all traces of the organic solvent are driven off. The acetate is now again filtered, washed first with warm water slightly acidulated with hydrochloric acid in order to remove the last portions of magnesium salts, and the washing is then carried to neutrality with clean warm water. The product is then pressed and dried at a temperature not exceeding 80° centigrade.

The peculiar nature of the solution formed as above described becomes strikingly apparent as the stage of precipitation with alcohol is reached, when a precipitate results which will not fall out in the usual form of sling-clots that dry into very hard and even horny masses, which are only slowly soluble. On the contrary, our invention produces a mass of fine flakes which after drying represent an extremely light and soft product readily soluble in any of the solvents for cellulose acetate.

What we claim, and desire to secure by Letters Patent, is—

1. The method or process herein described of manufacturing cellulose tetracetate, which consists in adding acetylchloride and acetic anhydride to a mixture of cellulose and magnesium acetate, thoroughly admixing such substances, and adding regulated quantities of nitro-benzene, substantially as set forth.

2. In the acetylizing process of manufacturing cellulose tetracetate, the method of controlling the reactions involved in said process, consisting in adding regulated quantities of nitro-benzene after the reaction has started substantially as described.

In testimony whereof we have hereunto set our hands in presence of two subscribing witnesses.

CARL OTTO WEBER.
C. F. CROSS.

Witnesses:
JNO. P. M. MILLARD,
FRED C. HARRIS.